(12) United States Patent
Jones, III

(10) Patent No.: US 12,000,199 B1
(45) Date of Patent: Jun. 4, 2024

(54) DOG CRATE WITH ACTUATOR LOCK AND VOICE ASSISTANT CAPABILITY

(71) Applicant: Johnny B. Jones, III, Sauk Village, IL (US)

(72) Inventor: Johnny B. Jones, III, Sauk Village, IL (US)

(*) Notice: Subject to any disclaimer, the term of this patent is extended or adjusted under 35 U.S.C. 154(b) by 477 days.

(21) Appl. No.: 17/458,980

(22) Filed: Aug. 27, 2021

Related U.S. Application Data

(60) Provisional application No. 63/115,891, filed on Nov. 19, 2020.

(51) Int. Cl.
| | |
|---|---|
| *A01K 1/03* | (2006.01) |
| *E05F 15/643* | (2015.01) |
| *E05F 15/77* | (2015.01) |
| *E05F 15/73* | (2015.01) |

(52) U.S. Cl.
CPC .............. *E05F 15/77* (2015.01); *A01K 1/034* (2013.01); *E05F 15/643* (2015.01); *E05F 2015/763* (2015.01); *G05B 2219/25257* (2013.01)

(58) Field of Classification Search
CPC ... E05F 15/77; E05F 15/643; E05F 2015/763; A01K 1/034; A01K 1/035
See application file for complete search history.

(56) References Cited

U.S. PATENT DOCUMENTS

| | | | |
|---|---|---|---|
| 8,359,783 B1 * | 1/2013 | Kamery | A01M 23/20 43/60 |
| 9,277,729 B1 * | 3/2016 | Wright | A01K 1/03 |
| 10,010,049 B2 * | 7/2018 | Kellogg | A01K 1/034 |

* cited by examiner

*Primary Examiner* — Vernal U Brown
(74) *Attorney, Agent, or Firm* — Fraline J. Allgaier

(57) ABSTRACT

An improved dog crate with Smart IOT connected features and a housing assembly being provided with a motor, a motor driver, and a microcontroller for selectively opening and closing a sliding door that is attached thereon. Custom-programmed software and databases include multiple inputs for receiving at least a first and a second encoded voice command associated with the opening and closing of the sliding door. The dog crate being operable with a graphical user interface being provided on an integrated LCD touch screen, a voice assistant device, or a remote access device being configured for Wi-Fi connectivity and being individually controlled by inputting the encoded voice commands.

6 Claims, 8 Drawing Sheets

DOG CRATE WITH ACTUATOR LOCK AND VOICE ASSISTANT CAPABILITY

RELATED APPLICATIONS

This application claims priority to U.S. Provisional Patent Application Ser. No. 63/115,891 filed Nov. 19, 2020.

FIELD OF THE INVENTION

The present invention relates generally to an improved dog crate with Smart IOT connected features and a sliding door using a voice activated wireless control system to lock or unlock said sliding door. The invention is specifically disclosed as a housing assembly accommodating a control unit including a microcontroller receiving encoded voice commands and having a method of establishing communication with the dog crate. The dog crated being provided with an integrated LCD touch screen, a voice assistant device, and a remote access device.

BACKGROUND OF THE INVENTION

A large number of devices relating to pet care and management can be found in interstate commerce. These include dog crates that are designed to recreate a dog's natural surroundings such that the dog feels comfortable. Additional reasons for using a dog crate include toilet training a new puppy, transportation, establishing a safe environment for the dog, or impounding the dog in a specific location. However, in the animal care industry, there is a need for controlled access to a dog crate to ensure the safety of the dog in case of fires or other emergencies. In the case of a pet that requires a quick escape, a housing that does not include the traditional methods of using a key might be ideal.

There has been a plurality of traditional dog crate designs that include mechanical and electronic measures to secure the crates and to increase functionality. Some traditional methods include reinforcing the crate with hardened metal padlocks, latches, or master locks.

Some non-traditional methods include automatic electronic dog doors that can be installed directly on the dog crate. These electronic dog doors feature dual power sources and magnetic keys that attach to a dog's collar. The door opens when the dog approaches and an electromagnetic field cooperatively triggers the door to open. As provided in most traditional dog crates, the door moves vertically between the frames. In some cases, a motor facilitates the opening and closing of the door.

Another example of the non-traditional method of opening a dog crate includes using microchips and other advanced technology. The door of the crate is adapted to read a dog's RFID tag. In cases where a RFID tag has not been implanted in a dog, the door of the crate is manufactured with an attached tag. However, none of the aforementioned methods would facilitate the quick and easy removal of a dog in emergency situations such as fires. The dogs would be unable to escape and would inevitably perish from burnt airways or lung injury.

In light of the above, it is believed that none of the devices provided in the prior art provide a quick and effective method of opening a dog crate. Such devices should be relatively easy to use and in most cases should not rely on the use of a device attached to the pet. In most cases, the opening and closing of the device should be carried out by direct human interaction and the crate would provide the security and comfort for the pet. To this end, the invention as provided herein relates to an improved dog crate with Smart IOT connected features and a sliding door using a voice activated wireless control system to lock or unlock the door. A microcontroller that is adapted to receive encoded voice commands and having a method of establishing communication between the dog crate and specified remote devices facilitates the movement of the door.

The device is further characterized with the following novel features: (1) A microcontroller having a method of establishing communication between the dog crate and an integrated LCD touch screen, a voice assistant device, and a remote access device; (2) One or more custom-programmed software and databases that are stored in a memory device and are configured to be executed by a microprocessor and the microprocessor having multiple inputs for receiving encoded voice commands; (3) At least a first and a second encoded voice command, the encoded voice commands being stored in the memory device, and the encoded voice commands being associated with the opening and closing of the door; (4) The dog crate having a housing assembly with a sliding door being operable by a command actuated locking mechanism that is electrically connected to a motor driver and the command actuated locking mechanism being responsive to the encoded voice commands for selectively opening and closing the sliding door; and (5) An integrated LCD touch screen, a voice assistant device, and a remote access device that are configured for Wi-Fi connectivity and are individually controlled via a graphic user interface by inputting encoded voice commands and enabling a user to control the operation of the dog crate.

BRIEF SUMMARY OF THE INVENTION

It is an advantage of the present invention to provide an improved dog crate with Smart IOT connected features and a voice activated wireless control system to lock or unlock the crate.

It is an additional advantage of the present invention to provide an improved dog crate featuring a housing assembly with electrical connection means being provided thereon for connecting a motor, a motor driver, and a microcontroller to an external electrical circuit. The motor being responsive to encoded voice commands for selectively opening and closing a sliding door.

It is still an additional advantage of the present invention to provide an improved dog crate having a microcontroller of standard construction and including a microprocessor being enabled to establish communication between the dog crate and an integrated LCD touch screen, a voice assistant device, and a remote access device.

It is an additional advantage of the present invention to provide an improved dog crate with one or more custom-programmed software and databases, wherein the one or more custom-programmed software and databases are stored in a memory device and are instructions to be executed by the microprocessor. The one or more custom-programmed software and databases include the microprocessor having multiple inputs for receiving encoded voice commands including a first and a second encoded voice command being associated with the opening and closing of the crate.

It is still an additional advantage of the present invention to provide an improved dog crate wherein the housing assembly includes a sliding door being connected thereon. The sliding door being operable by a command actuated locking mechanism that is electrically connected to the microprocessor and the command actuated locking mechanism being responsive to the encoded voice commands for selectively opening and closing the sliding door.

It is still an additional advantage of the present invention to provide an improved dog crate wherein the command actuated locking mechanism of the sliding door is characterized by the motor being coupled to a linearly movable steering actuator that comprises a belt and pulley. This arrangement provides for the bi-directional movement of the door. The actuated locking mechanism receives the encoded voice commands and thereby being enabled to open and close the sliding door.

It is still an additional advantage of the present invention to provide an improved dog crate wherein the integrated LCD touch screen, the voice assistant device, and the remote access device are configured for Wi-Fi connectivity and are individually controlled by inputting the voice commands and enable the user to control the operation of the dog crate. The control unit is configured to receive the encoded voice commands from a graphic user interface.

It is still an additional advantage of the present invention to provide an improved dog crate including an integrated LCD touch screen, a voice assistant device, and a remote access device having a graphical user interface for receiving encoded voice commands from a user. The user interface further displaying the voice interaction between the user and the dog crate.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

Additional advantages and features of the present invention will become more apparent when considered in light of the following specification and drawings.

BRIEF DESCRIPTION OF THE SEVERAL VIEWS OF THE DRAWINGS

The present embodiments are illustrated by way of the figures of the accompanying drawings, which may not necessarily be to scale, in which like references indicate similar elements, and in which.

DETAILED DESCRIPTION OF THE INVENTION

An exemplary application of the present invention is described as follows. All illustrations of the drawings are for the purpose of describing selected versions of the present invention and are not intended to be limiting in scope. It will be apparent to a person having ordinary skill in the art that the invention as presented is useable with or without some of the various parts described.

An improved dog crate 10 with Smart IOT connected features using a voice activated wireless control system to lock or unlock a sliding door 12 is disclosed.

Figure 1:
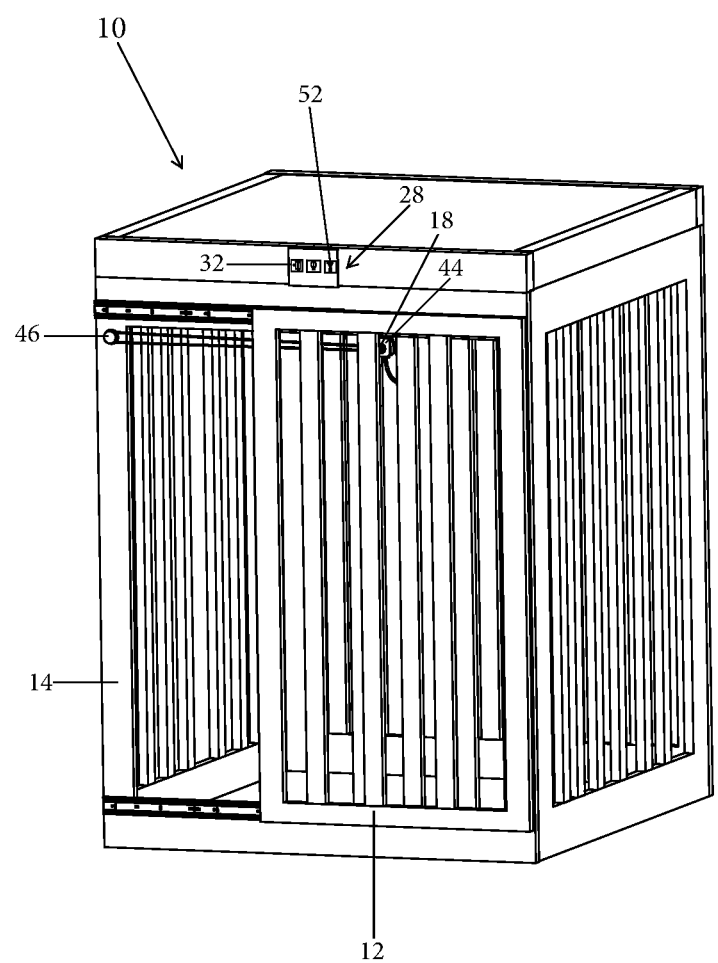
FIGS. 1 and 2 illustrate an exemplary view of the device showing the sliding door in opened and closed positions.
Figure 2:
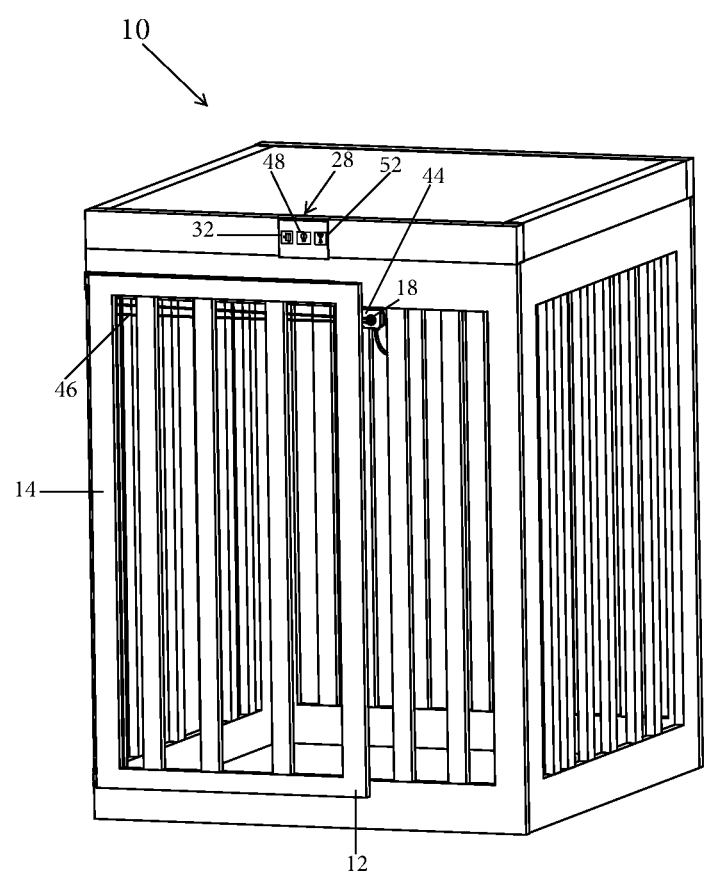

FIGS. 1 and 2 illustrate an exemplary view of the dog crate 10 showing the sliding door 12 in open and closed positions. The dog crate 10 features a housing assembly 14 with electrical connection means 16 being provided thereon for connecting a motor 18, a motor driver 22, and a microcontroller 26 to an external electrical circuit 24. In a preferred embodiment, the motor 18 is a bipolar stepper motor providing higher torque and improved efficiency for the particular backwards and forwards movement of the sliding door 12. The housing assembly 14 further accommodates a microcontroller of standard construction 26 and including a microprocessor having a memory device coupled therein.

Figure 3:
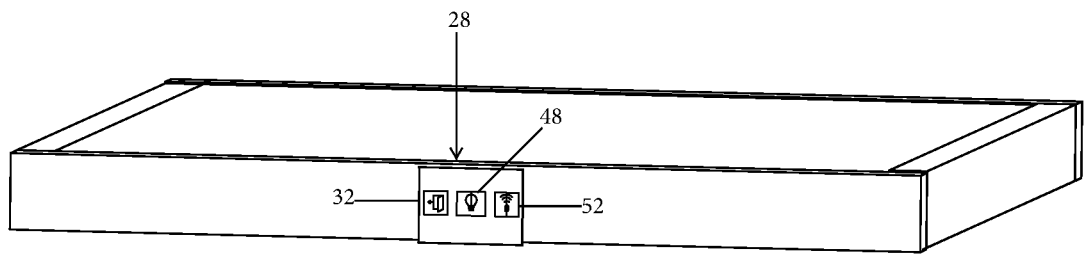
FIG. 3 illustrates an exploded view of the graphical user interface showing the type icons providing the status of the sliding door.
Figure 4:
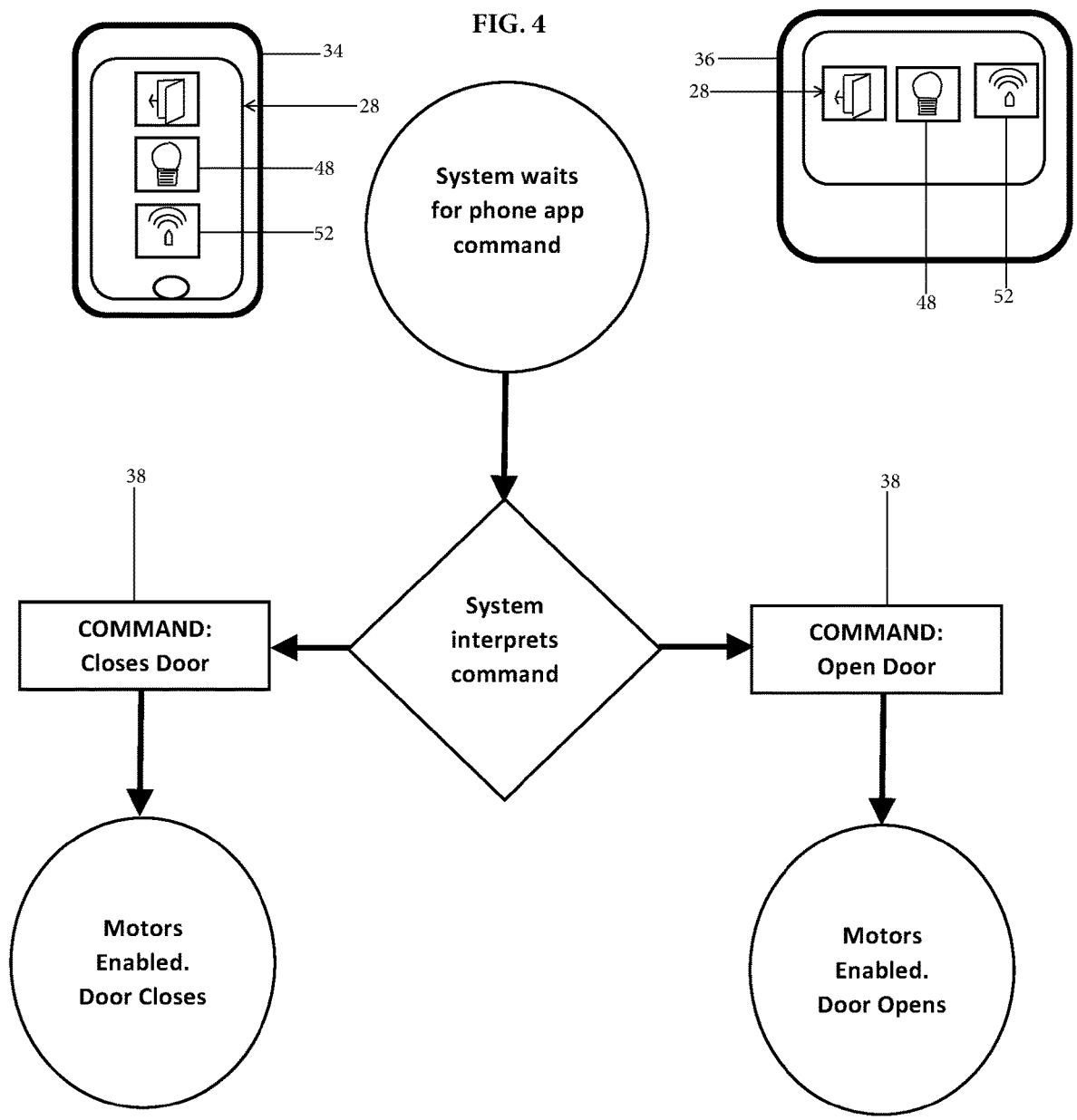
FIG. 4 schematically illustrates the voice activated wireless control system of the invention as provided herein utilizing remote access devices to lock or unlock the sliding door.
Figure 5:
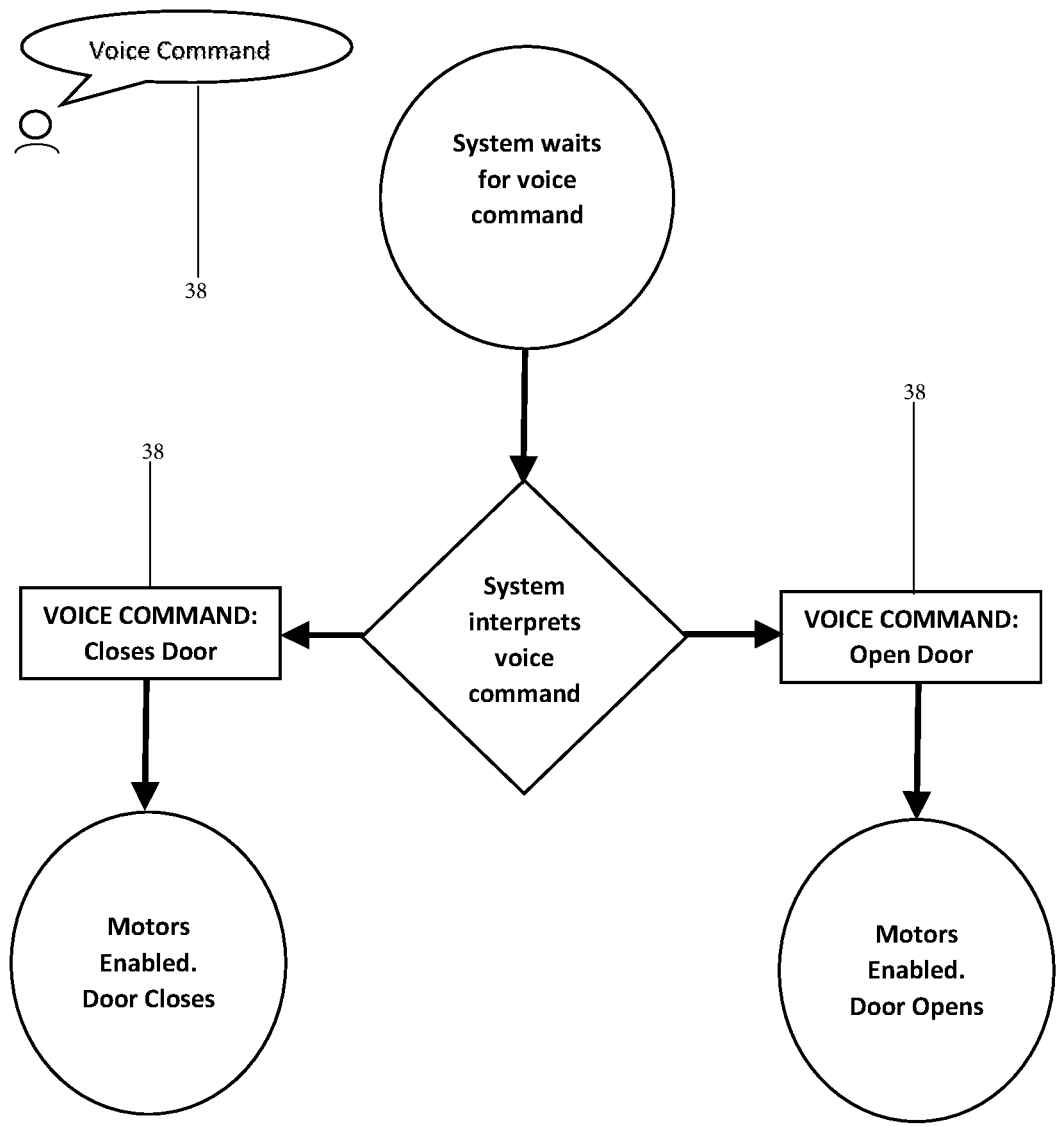
FIG. 5 schematically illustrates the voice activated wireless control system of the invention as provided to lock or unlock the sliding door.

FIGS. 3, 4, and 5 Provide additional illustrations of the graphical user interface 28 and schematic illustrations of the voice activated wireless control system of the invention utilizing an integrated LCD touch screen 32, a remote access device 34, and a voice assistant device 36, to lock or unlock the sliding door 12. The microcontroller 26 as provided herein includes a method of establishing communication between the dog crate 10 and the integrated LCD touch screen 32, the remote access device 34, and the voice assistant device 36. One or more custom-programmed software and databases are stored in the memory device and are instructions to be executed by the microcontroller 26. The one or more custom-programmed software and databases include the microcontroller 26 having multiple inputs for receiving encoded voice commands 38 including a first and a second encoded voice command being associated with the opening and closing of the sliding door 12. In at least one embodiment as provided herein, the remote access device 34 is a mobile device.

Figure 6:
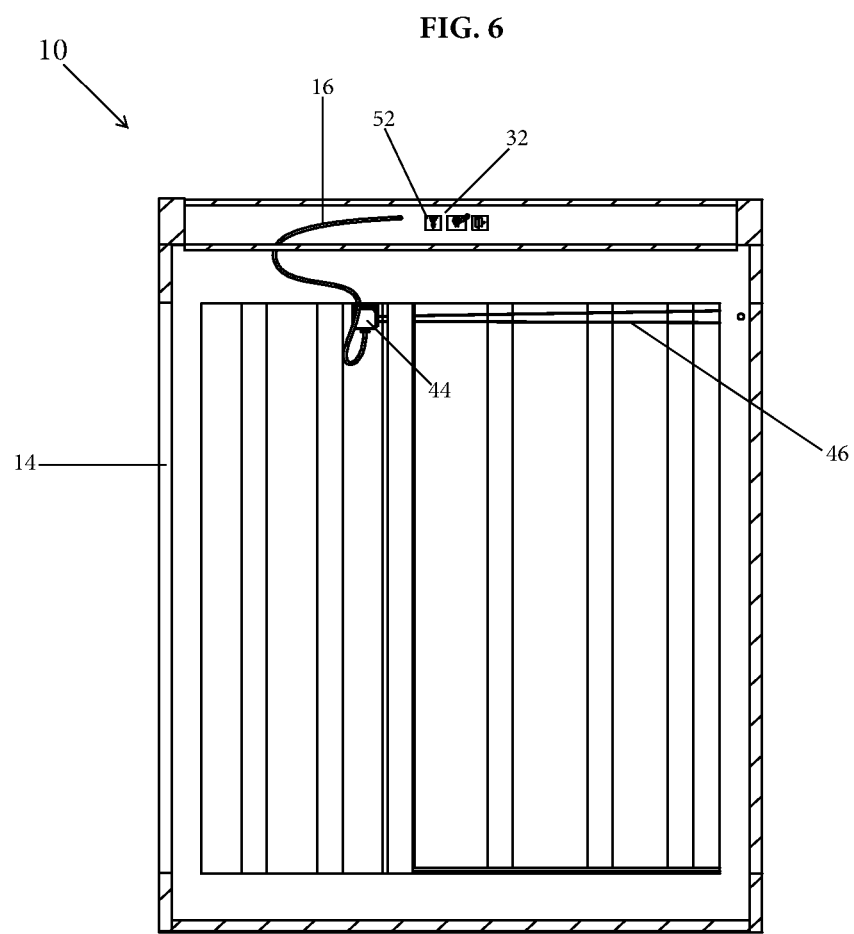
FIG. 6 illustrates a front cross-sectional view showing the command actuated locking mechanism.
Figure 7:
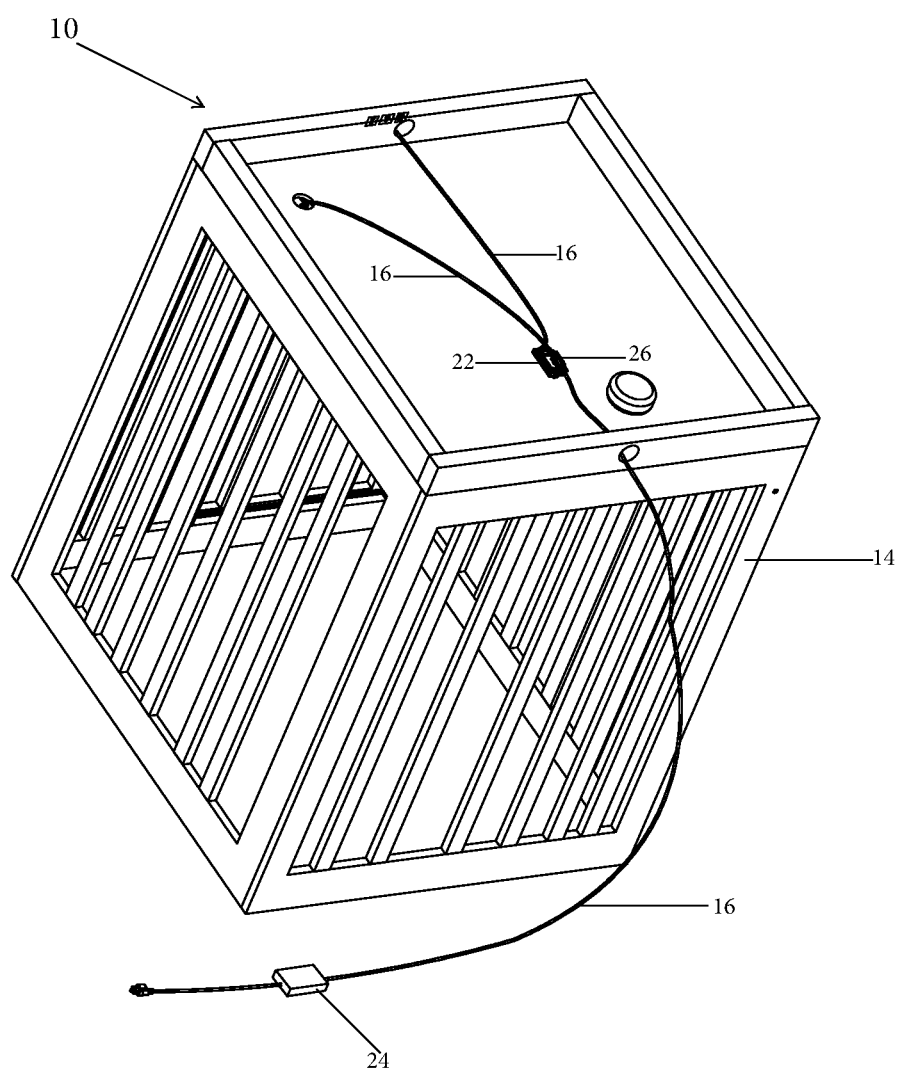
FIGS. 7 and 8 illustrate exemplary views of the housing assembly with the electrical connection means being provided therein.
Figure 8:
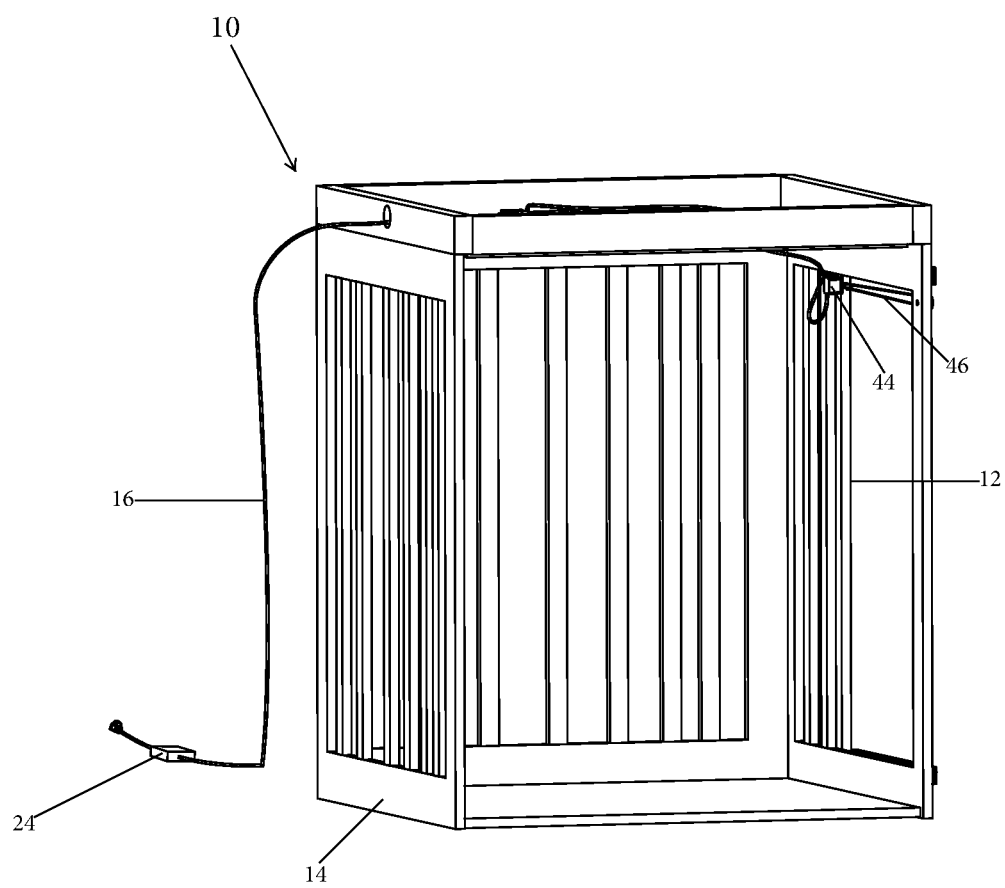

FIGS. 6, 7, and 8 illustrate a front cross-sectional view showing the command actuated locking mechanism 44 and an exemplary view of the housing assembly 14 with the electrical connection means 16 being provided therein. The sliding door 12 being operable by the command actuated locking mechanism 44 being electrically connected to the control unit and the command actuated locking mechanism 44 being responsive to the encoded voice commands 38 for selectively opening and closing the sliding door 12. The command actuated locking mechanism 44 being characterized by the motor 18 being coupled to a linearly movable steering actuator 46. The linearly movable steering actuator 46 comprises a belt and pulley providing the bi-directional movement and wherein the command actuated locking mechanism 44 receives the encoded voice commands 38 and thereby being enabled to open and close the sliding door 12.

The integrated LCD touch screen 32, remote access device 34, and voice assistant device 36 are configured for Wi-Fi connectivity and are individually controlled by inputting the encoded voice commands 38 and thereby enable a user to control the operation of the dog crate 10. Each unit is configured to receive the encoded voice commands 38 via a graphical user interface 28 for interacting with microcontroller 26. The graphical user interface 28 receives each command from a user as encoded voice commands 38. The graphical user interface 28 then displays the voice interaction between the user and the dog crate 10. The graphical user interface 28 further displays type icons 48 and illuminating LED lights for a specific luminance pattern associated with the encoded voice commands 38.

In at least one embodiment, the integrated LCD touch screen 32, remote access device 34, and voice assistant device 36 can include at least one voice-user interface 52 for interacting with the user. The voice-user interface 52 thereby being adapted to receive encoded voice commands 38 from the user and processes the voice commands 38 to determine the user intent associated therewith.

It will be understood that a plurality of changes can be anticipated in the construction of the device 10 without departing from the spirit of the invention, one such change may be the methodology being used to navigate the graphical user interface 28 or the development of a unique set of icon representations, animated images of relevant themes, icon menus for the selection of a plurality of voice-user interface representations 52, movements of the sliding door 12, or novel functioning of the features being provided herein. The addition of these novelty features could depend on the frequency of use of the crate 10 and location of use. Any such changes to the features as provided herein could be developed in consideration of a plurality of touch screen technologies and designs.

Although the desired construction is of a rectangular shaped housing assembly 14 providing for a sliding door 12 of 18.5 inch length×1.5 width×30 thickness, the dog crate 10 can be constructed in various sizes and can be provided in a standard construction including the provision of durable materials for all elements as provided herein. The sliding door 12 can be provided as desired by a user. This can include shapes that are of particular interest for manufactures of pet supplies or pet owners.

Having described my invention, however, many modifications thereto will become apparent to those skilled in the art to which it pertains without deviation from the spirit of the invention as defined by the scope of the appended claims. Although the invention has been explained in relation to its preferred embodiment, it is to be understood that many other possible modifications and variations can be made without departing from the spirit and scope of the invention.

What is claimed is:

1. An improved dog crate with Smart IOT connected features and a sliding door using a voice activated wireless control system to lock or unlock said sliding door, said dog crate further comprising:
   a) a housing assembly with said sliding door being attached thereon;
   b) said housing assembly having electrical connection means being provided on said housing assembly for connecting a motor, a motor driver, and a microcontroller to an external electrical circuit, said motor being responsive to encoded voice commands for selectively opening and closing said sliding door;
   c) said microcontroller being a microcontroller of standard construction and thereby accommodating a microprocessor having a memory device coupled to said microprocessor, said microprocessor storing instructions adapted to be executed by said microprocessor;
   d) said microcontroller having a method of establishing communication between said dog crate and an integrated LCD touch screen, a voice assistant device, and a remote access device;
   e) one or more custom-programmed software and databases, wherein said one or more custom-programmed software and databases are stored in said memory device and are configured to be executed by said microcontroller, the one or more custom-programmed software and databases include said microcontroller having multiple inputs for receiving said encoded voice commands including a first and a second encoded command, said encoded voice commands being stored in said memory unit of said microcontroller, said encoded voice commands being associated with the opening and closing of said sliding door,
   f) said housing assembly having said sliding door being connected thereon and said sliding door being operable by a command actuated locking mechanism that is electrically connected to said microcontroller and said command actuated locking mechanism being responsive to said encoded voice commands for selectively opening and closing said sliding door, said command actuated locking mechanism being characterized by said motor being coupled to a linearly movable steering actuator which comprises a belt and pulley providing the bi-directional movement of said sliding door and wherein said actuated locking mechanism receives said encoded voice commands and thereby being enabled to open and close said sliding door;
   g) said integrated LCD touch screen, said voice assistant device, and said remote access device being configured for Wi-Fi connectivity and being individually controlled by inputting said encoded voice commands and enabling a user to control the operation of said dog crate and wherein said microcontroller is configured to receive said encoded voice commands via a graphical user interface; h) providing at said integrated LCD touch screen, said voice assistant device, and said remote access device, said graphical user interface for interacting with said microcontroller, said graphical user interface receiving said encoded voice command commands from a user, said graphical user interface displaying the voice interaction between said user and said dog crate; said graphical user interface displaying type icons and illuminating LED light for a specific luminance pattern; l) providing at said integrated LCD touch screen, said voice assistant device, and said remote access device at least one voice-user interface for interacting with the user; said voice-user interface receiving said encoded voice commands from said user and processes said encoded voice commands to determine a user intent associated with said encoded voice commands.

2. The dog crate of claim 1 wherein said LCD touch screen of said dog crate is a touch screen recognizing the touch of a finger.

3. The dog crate of claim 1 wherein said icons of said LCD touch screen represent a status of said dog crate.

4. The dog crate of claim 1, wherein said remote access device of said dog crate is a mobile device.

5. The dog crate of claim 1 wherein said remote access device and said voice assistant device of said dog crate provide said voice commands from a remote location away from said housing assembly.

6. The dog crate of claim 1 wherein said motor of said dog crate is a bipolar stepper motor.

* * * * *